United States Patent Office 3,822,286
Patented July 2, 1974

3,822,286
EMULSION PROCESS FOR SULFOLENE AND SULFOLANE PRODUCTS
Herbert J. Goldstein, Rockaway, and Hsiao-Jun Li, Morristown, N.J., assignors to Texas-U.S. Chemical Company, Parsippany, N.J.
No Drawing. Continuation-in-part of abandoned application Ser. No. 825,385, May 16, 1969. This application Oct. 26, 1971, Ser. No. 192,634
Int. Cl. C07d 63/00, 63/12
U.S. Cl. 260—332.1                1 Claim

ABSTRACT OF THE DISCLOSURE

Sulfolene, a typical conjugated diene cyclic sulfone, is prepared by emulsifying butadiene in water in the absence of oxygen or with an antioxidant present, and thereafter reacting the emulsion with sulfur dioxide under high pressure, for a period sufficient to complete reaction with the butadiene, whereby yields approaching quantitative are obtained.

CROSS-REFERENCE TO RELATED APPLICATION

The present application is a continuation-in-part of application Ser. No. 825,385, filed May 16, 1969, now abandoned.

BACKGROUND OF THE INVENTION

(1) Field of the Invention

This invention relates to the production of sulfolene. Sulfolene, or butadiene sulfone, is a well-known cyclic monosulfone which has considerable value as a chemical intermediate (and as a source of pure butadiene by thermal decomposition). It can be readily hydrogenated to sulfolane, which is a valuable selective solvent for many organic substances, as well as a thermally stable inert reaction medium.

(2) Description of the Prior Art

The conventional method for preparing sulfolene is to mix a large molar excess of liquid butadiene, or the appropriately substituted diene, with liquid sulfur dioxide under non-aqueous conditions, at pressures between 100 and 500 pounds per square inch and at a temperature of about 100° C. The reaction times required under these conditions, that is, without some modification of the process, can be as high as two days. The bulk of the literature as a consequence, is largely composed of reports on optimizing this basic process.

In addition to the problem of extended reaction times, sulfur dioxide and butadiene in the conventional processes also react to form (insoluble) polymeric butadiene sulfones; generally those conditions which increase the reaction rate for the sulfolene reaction also increase the rate for the polymer reaction.

Because of these factors, most of the investigative work on sulfolene, and conjugated diene sulfones has been oriented toward improving the efficiency and yield from the sulfolene reaction. This has resulted in the development of methods involving the use of polymer inhibitors to prevent formation of the polysulfone (U.S. 2,443,270); sodium hydroxide washing of the butadiene to eliminate peroxides, which favor the formation of polymer (U.S. 2,420,834); and various techniques to achieve improved results by accurately controlling the temperature of the reaction (U.S. 2,402,891 and 2,395,050). Other procedures describe the preparation of sulfolene in alcohols or other organic substances (U.S. 3,077,479). For the most part, however, no significant work has been directed toward developing a new approach to the actual synthesis of sulfolene.

Accordingly, the fundamental object of this invention is to provide a method of preparing sulfolene compounds in substantially improved yields and in shorter times than can be reached with known methods.

SUMMARY OF THE INVENTION

We have discovered that sulfolene can be efficiently produced by reacting sulfur dioxide with an aqueous suspension or emulsion of butadiene in approximately equal molar amounts using a quantity of non-oxygenating water sufficient at least to dissolve all sulfolene formed by the reaction. Conversions in excess of 50% and generally higher than 80% are readily obtained by this process in reaction times ranging from one to three hours. Of the reaction product obtained, 65% to 100% is sulfolene while the remainder is the sulfone polymer. One of the advantages of the aqueous emulsion reaction will be immediately evident, when it is noted that sulfolene is very soluble in hot water, while the polymeric sulfone is very insoluble. Sulfolene dissolves in the aqueous medium virtually as rapidly as formed. The two as a result, can be easily and virtually automatically separated by filtration of the hot aqueous reaction mixture, thereby avoiding any complicated purification procedures or operations. A further advantage of the aqueous process is that the excess sulfur dioxide is readily removed as a gas at the end of the reaction, and none is present in the finished product. This feature is important to the hydrogenation of the sulfolene to sulfolane, as it eliminates the necessity for costly purification process.

PREFERRED EMBODIMENTS

In the aqueous emulsion preparation of sulfolene, the most important step is rendering the water nonoxygenating. Water normally contains dissolved oxygen and, as such, it is "oxygenating" in that it is capable of supplying or imparting active oxygen to materials in contact with such water. By "nonoxygenating water" we mean water which has been treated to prevent its imparting or releasing active oxygen either: (1) by deaeration of the water prior to using it in the system, or (2) as presently preferred, by the addition of an appropriate antioxidant in the water phase of the reaction system. It has been found that the solubility of the antioxidant at the reaction conditions has an important bearing on the yield of sulfolene product. Thus solubility under the proposed reaction conditions is an important factor to be considered in the selection of the antioxidant.

If the water is rendered nonoxygenating by deaeration, any conventional deaeration means may be used, such as purging the water by providing means for intimate contact with a flowing stream or an atmosphere of nitrogen, inert gas, or steam.

In the absence of deaeration or the incorporation of an antioxidant in the process water, the product of the aqueous reaction will contain about 15% sulfolene and 85% polysulfone. If the water is rendered nonoxygenating by deaeration with nitrogen, the product will contain about 65% sulfolene and 35% polymer.

When the water is rendered nonoxygenating by use of an antioxidant in accordance with the presently preferred embodiment of this invention, the sulfolene content is increased to the 80% to 100% level with a corresponding drop in the amount of polysulfone. The applicable polymer inhibitors and antioxidants include: Alkyl, aryl, or hydroxyphenol and alkyl or aryl mercaptan, an inorganic salt of inorganic lower valence sulfur acid, an inorganic salt of inorganic lower valence phosphorous acid, or mixtures thereof. Examples of suitable antioxidants include hydroquinone, sodium dithionite, sodium hypophosphite, sodium sulfide, sodium sulfite, thiophenol, n-octyl mercaptans, n-butyl mercaptan, tert-butylcatechol, and 2,6-ditert-butyl-4-methylphenol. It should be noted that in as much as the sulfolene reaction is conducted under acidic conditions, the seelcted antioxidant must be able to function in an acid medium. Sodium dithionite and sodium sulfide, are acid unstable compounds which have been found to be exceptions to this requirement, and, as such, are readily applicable for use in the novel process of this invention.

The antioxidants are used at levels of 0.1 to 15 parts per 1000 parts of water charged into the reactor. The preferred level is 2.5 to 7 parts per 1000 parts of water used.

Inasmuch as the water is to be the continuous phase for the reaction system as well as the solvent for the sulfolene product, it is important to precisely establish the proportions of butadiene and water to be used prior to forming the emulsion. The reaction which is used in making this determination is

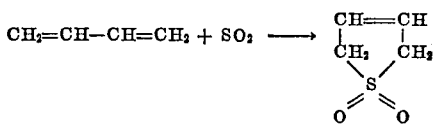

Under optimum conditions, it is feasible to aim for a saturated aqueous solution of sulfolene product. This indicates the initial presence of 80–180 parts butadiene per 100 parts of water. It is preferred, however, to operate at about ¼ to ¾ of that level in order to maintain complete control over the reactions.

When the sulfur dioxide ingredient is dissolved in water it produces a pH of about 2.0. Thus, the reaction in aqueous systems between sulfur dioxide and buadiene occurs under acidic conditions, i.e., a pH level of approximately 2.0. It is therefore necessary when forming the butadiene emulsion to use an emulsifying agent which functions under such acidic conditions. The desired dispersion system may be achieved by the use of from about 0.05% to 1.0%, based on the weight of water, of an emulsifying agent which may be an anionic, cationic, nonionic or amphoteric emulsifier. Suitable emulsifiers include sodium lauryl sulfate, sulfonated fatty acid derivatives, sulfonates, sulfates, aliphatic phosphate esters, alkanolamides, heterocyclic acids, substituted sarcosinates, salts of sulfosuccinate derivatives of fatty acids, salts of dodecyl sulfate, salts of alkyl aryl sulfonates, salts of mono- or di-alkyl phosphoric acids, amphoteric salts of fatty acid 2-imidazolinyl compounds, salts of fatty alcoyl sarcosine, and fatty acid alkanolamides. Among those found to be especially effective are the following:

| Type | Trade name | Formula |
|---|---|---|
| Alkylammonium alkylsulfate | Sipex A | $\left[C_{12}H_{25}-O-\overset{\overset{O}{\|}}{\underset{\underset{O}{\|}}{S}}-O\right]^{-} [NH_4]^{+}$ |
| | | $\left[C_{12}H_{25}-O-\overset{\overset{O}{\|}}{\underset{\underset{O}{\|}}{S}}-O\right]^{-} \left[C_2H_5-\overset{\overset{H}{\|}}{\underset{\underset{H}{\|}}{N}}-C_2H_5\right]^{+}$ |
| Alkanolammonium alkylsulfate | | $\left[C_{12}H_{25}-O-\overset{\overset{O}{\|}}{\underset{\underset{O}{\|}}{S}}-O\right]^{-} \left[HO-C_2H_4-\overset{\overset{CH_3}{\|}}{\underset{\underset{CH_3}{\|}}{N}}-H\right]^{+}$ |
| | Sipex DEA | $\left[C_{12}H_{25}-O-\overset{\overset{O}{\|}}{\underset{\underset{O}{\|}}{S}}-O\right]^{-} \left[HO-C_2H_4-\overset{\overset{H}{\|}}{\underset{\underset{H}{\|}}{N}}-C_2H_4-OH\right]^{+}$ |
| | Sipex LT6 | $\left[C_{12}H_{25}-\overset{\overset{O}{\|}}{\underset{\underset{O}{\|}}{O}}-S-O\right]^{-} \left[HO-C_2H_4-\overset{\overset{H}{\|}}{\underset{\underset{C_2H_4OH}{\|}}{N}}-C_2H_4=OH\right]^{+}$ |
| Sarcosinate | Sarkosyl O | $CH_3-(CH_2)_7-CH=CH-(CH_2)_7-\overset{\overset{O}{\|}}{C}-\underset{\underset{CH_3}{\|}}{N}-CH_2-\overset{\overset{O}{\|}}{C}-OH$ |
| Sarcosinate | Sarkosyl NL-30 | $C_{11}H_{23}-\overset{\overset{O}{\|}}{C}-\underset{\underset{CH_3}{\|}}{N}-CH_2-\overset{\overset{O}{\|}}{C}-ONa$ |
| Alkanolamide | Witamide No. 272 | $CH_3-(CH_2)_7-CH=CH-(CH_2)_7-\overset{\overset{O}{\|}}{\underset{\underset{H}{\|}}{C}}-N-CH_2-\overset{\overset{OH}{\|}}{CH}-CH_3$ |
| Alkanolamide sulfosuccinate | Emcol K-8300 | $\left[CH_3-(CH_2)_7-CH=CH-(CH_2)_7-\overset{\overset{O}{\|}}{\underset{\underset{H}{\|}}{C}}-\underset{\underset{}{}}{N}-CH_2-\overset{\overset{CH_3}{\|}}{CH}-O-\overset{\overset{O}{\|}}{C}\atop{-O-\overset{\overset{O}{\|}}{C}-CH-CH_2\atop O-SO_3}\right] Na_2$ |
| | Emcol F-3250 | $\left[CH_3-(CH_2)_7-CH=CH-(CH_2)_7-\overset{\overset{O}{\|}}{\underset{\underset{H}{\|}}{C}}-N-CH_2-\overset{\overset{CH_3}{\|}}{CH}-O-\overset{\overset{O}{\|}}{C}\atop{-O-\overset{\overset{O}{\|}}{C}-CH-CH_2\atop -O-SO_3}\right]^{-} \left[CH_3-\overset{\overset{OH}{\|}}{CH}-CH_2-\overset{\overset{H}{\|}}{\underset{\underset{H}{\|}}{N}}\right]^{+}_{2}$ |
| Alkanolammonium alkarylsulfonate | Emcol P10-59 | $\left[C_{12}H_{25}-\langle C_6H_4\rangle-\overset{\overset{O}{\|}}{\underset{\underset{O}{\|}}{S}}-O\right]^{-} \left[CH_3-\overset{\overset{OH}{\|}}{CH}-CH_2-\overset{\overset{H}{\|}}{\underset{\underset{H}{\|}}{N}}-H\right]^{+}$ |

TABLE—Continued

| Type | Trade name | Formula |
|---|---|---|
| Alkanolmonoglyceride sulfonate | Sipon MGS100 | $\left[ C_{11}H_{23}-\underset{\underset{O}{\|}}{C}-O-CH_2-\underset{\underset{OH}{\|}}{CH}-CH_2-\underset{\underset{O}{\|}}{\overset{\overset{O}{\|}}{S}}-O \right]^- Na^+$ |
| Sodium lauryl sulfate | Duponol WAQE | $C_{12}H_{25}SO_4 Na$ |
| Complex organic polyphosphonic ester. | Strodex PK-90 | Potassium salt. |
| Heterocyclic acid salt | Miranol C2MSF conc. Miranol Jem. conc. | 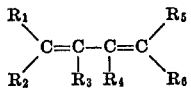 $\quad Na_2^+ \quad$ R=coconut fatty acid <br> $OH^- \quad$ R=octoic acid |
| Isooctyl phenyl polyethoxy ethanol. | Triton X-100 | $CH_3-\underset{\underset{CH_3}{\|}}{\overset{\overset{CH_3}{\|}}{C}}-CH_2-\underset{\underset{CH_3}{\|}}{\overset{\overset{CH_3}{\|}}{C}}-\bigcirc-\left(O-CH_2-CH_2\right)_{9-10}-OH$ |

The emulsifier is used at levels of 0.5 to 10 parts per 1000 parts of water charged, and the preferred level is 3 to 6 parts.

Although butadiene is the preferred conjugated diene monomer with regard to the process of this invention, other diene monomers may effectively utilized therein. It is thus appropriate to characterize the applicable diene monomers in terms of the following formula:

$$\underset{R_2}{\overset{R_1}{\diagdown}} C = \underset{R_3}{\overset{\|}{C}} - \underset{R_4}{\overset{\|}{C}} = C \overset{R_5}{\underset{R_6}{\diagup}}$$

wherein $R_1$, $R_2$, $R_3$, $R_4$, $R_5$ and $R_6$ are independently selected from the group consisting of hydrogen atoms and alkyl, alkenyl, aryl, alkoxy, alkaryl, aralkyl, cycloalkyl, cycoalkenyl and halogen radicals. Among the applicable conjugated diene monomers are included:

butadiene-1,3;
2-methyl butadiene-1,3 (isoprene);
pentadiene-1,3 (piperylene);
2,3-dimethyl butadiene-1,3;
2,3-diethyl butadiene-1,3;
2,3-di-tertiary-butyl butadiene-1,3;
2-tertiary-butyl butadiene-1,3;
1,2,3,4-tetramethyl butadiene-1,3;
1,4-dimethyl-2,3-diethyl butadiene-1,3;
2-methyl pentadiene-1,3;
4-methyl pentadiene-1,3;
2-methyl hexadiene-1,3;
4-ethyl hexadiene-1,3;
cyclopentyl butadienes;
cyclohexyl butadienes;
cyclopentyl hexadienes 2-phenyl butadiene-1,3;
2-chlorbutadiene-1,3;
2-methyl-3-chlorbutadiene-1,3;
3-methoxybutadiene-1,3;

and the like. Needless to say, the use of any of these materials will result in the preparation of the correspondingly substituted sulfolene product, and the term "sulfolene compound" as used herein and in the claims includes the compound "sulfolene" and such substituted sulfolene products. For purposes of this disclosure, statements attributed to butadiene are equally applicable to any of these diene monomers.

EXAMPLE I

In the typical practice of this invention 50 to 1700 parts, by weight (1 to 30 moles) of butadiene is dispersed in 1000 parts, by weight, of water containing 0.5 to 10 parts, by weight, of emulsifying agent, and 0.1 to 15 parts, by weight, of an antioxidant. The dispersal and/or emulsification of the butadiene is carried out under agitation at pressures between 60 and 550 pounds per square inch gauge at about 25° C. The temperature is subsequently adjusted to between 60° C. and 150° C., following which 60 to 1900 parts (1 to 30 moles) of sulfur dioxide are added to the emulsion. The broad and preferred ranges of ingredients and operating conditions for the process are summarized as follows:

|  | Broad range | Preferred range |
|---|---|---|
| Water (parts by weight) | 1,000 | 1,000 |
| Butadiene (parts by weight) | 50–1,700 | 200–1,000 |
| Sulfur dioxide (parts by weight) | 60–1,900 | 250–1,200 |
| Emulsifier (parts by weight) | 0.5–10 | 3–6 |
| Antioxidant (parts by weight) | 0.1–15 | 2.5–7 |
| Reaction Temperature (° C.) | 60–150 | 90–130 |
| Reaction Pressure (pounds per square inch gauge) | 60–550 | 60–500 |

The mixture is allowed to react over a period of 1 to 5 hours. At this point, 80% to 100% of the butadiene has been converted to sulfolene. The reaction is cooled gradually to 50° C. to 60° C. and the pressure reduced to 60 to 100 p.s.i.g. The excess sulfur dioxide is either vented off or removed by treating the reaction mixture with sodium bicarbonate to form sodium sulfite. At this point the reaction mixture is a yellow slurry. The mixture is heated to 85° C. and filtered to remove the polysulfone which has formed during the reaction. The pure sulfolene may be recovered by crystallizing it out of solution by cooling the reaction mixture to room temperature or below. The product can further be purified by recrystallizing from water and/or alcohol a second time. The final product after filtering is vacuum dried and stored for future use, or it is hydrogenated to the saturated compound, sulfolane.

The sulfolene produced by this process has excellent storage stability and, as mentioned previously, requires no additional processing to remove residual sulfur dioxide prior to use, as is the case with the compound prepared by conventional non-aqueous methods.

A variation on this method consists in recycling the mother liquor in a semi-continuous process. The efficiency of the recycling variation is improved by the addition of antioxidant to the mother liquor before each cycle begins. For this purpose, it has been found that between 2 and 7 parts of antioxidant provide added protection against the formation of polysulfone.

As mentioned previously, the sulfolene produced by this process can be readily hydrogenated to the saturated form of the molecule. This can be accomplished with a conventional technique using Raney nickel, pelletized supported nickel, palladium oxide, platinum oxide, etc. as catalyst. Generally between 5% to 20% of the catalyst based on the weight of sulfolene will be sufficient to produce satisfactory results. The hydrogenation reaction can be conducted at temperatures between 40° C. and 50° C. and at pressures of about 60 p.s.i.g. or at elevated temperatures between 50° C. and 100° C. at much higher pressures of about 600 p.s.i.g. Between 1 to 7 hours and usually about 4 hours, are required to obtain conversions at the 85% level.

The following examples will afford a better understanding of the invention to those skilled in the art.

EXAMPLE II

This example demonstrates the practice of this invention utilizing a variety of antioxidants and emulsifying agents in aqueous and aqueous emulsion systems. The experiments in this sequence of examples also exhibit the use of a number of different temperature and pressure conditions. Their total effect can be judged from the data reported in Tables IA and IB below.

Specifically the data in Table IA illustrates the improvement in sulfolene yield and total conversion in a water system accompanied by water deaeration and/or use of appropriate antioxidants. The data in Table IB illustrates comparable results through the use of emulsion systems with appropriate emulsifiers and antioxidants.

The basic procedure for conducting these experiments involved dissolving the antioxidant and 2.1 grams of emulsifying agent in deaerated redistilled water by heating and then charging the soap solution into a 2000 milliliter Parr Series 4500 stirred reactor. Liquid butadiene, purified by passing it through an alumina column, was charged into the reactor and the contents were stirred for 15 minutes. Liquid sulfur dioxide was then added to the reactor with stirring. The reactants were heated rapidly to 90° C. and then maintained above 90° C. and below 130° C., with stirring, for about 3 hours. The temperature inside the reactor was measured by a Weston dial thermometer, and an iron-constantan thermocouple. The temperature of the heating jacket was measured with an iron-constantan thermocouple.

The pressure inside the reactor increased from 60 p.s.i.g. to a maximum of nearly 400 p.s.i.g., and then dropped rapidly. Upon conclusion of the reaction, as indicated by the stable lower pressure of about 80–100 p.s.i.g., the reactor was cooled gradually to about 50 to 60° C., during which time the pressure decreased further to about 60 to 80 p.s.i.g. The reactor was vented to eliminate excess sulfur dioxide and the contents removed.

The reaction mixture was a yellowish slurry. This was heated to 85° C. and stirred until the yellowish color changed gradually to white. The white slurry was then filtered. The residue was digested with hot water and filtered, after which the filtrates were combined. On cooling, white crystals separated. Additional product was obtained by concentrating the mother liquors. The combined product was dried by suction and finally dried over calcium chloride under vacuum.

The water insoluble product, i.e., the butadiene polysulfone, was dried in air and then over calcium chloride under vacuum.

TABLE IA

[Reaction of butadiene and sulfur dioxide in water system]

| Run | Water (grams) | Antioxidants Type | Amount (gms.) | Butadiene (gm.-mols) | $SO_2$ (gm.-mols) | $SO_2$:butadiene (gm.-mols) (ratio) | Peak pressure (p.s.i.g.) | Peak temp. (°C.) | Time (hrs.) | Percent conv. | Percent 3-sulfolene | Percent polysulfone |
|---|---|---|---|---|---|---|---|---|---|---|---|---|
| 1 | 450 | HQ[1] | 3 | 3.76 | 3.95 | 1.05 | 490 | 127 | 3½ | 76 | 99 | 1 |
| 2 | 450 | None | | 3.71 | 3.75 | 1.01 | 400 | 145 | 4 | 78 | 15 | 85 |
| 3 | [2]450 | do | | 3.75 | 3.79 | 1.01 | 420 | 120 | 3½ | 83 | 65 | 35 |
| 4 | 450 | HQ[1] | 3 | 3.71 | 3.75 | 1.01 | 450 | 121 | 3½ | 86 | 99 | 1 |
| 5 | 450 | $Na_2S_2O_4$ | 1 | 3.71 | 4.05 | 1.09 | 510 | 126 | 4 | 87 | 89 | 11 |
| 6 | 450 | $NaH_2PO_2 \cdot H_2O$ | 1 | 3.71 | 3.75 | 1.01 | 500 | 128 | 4 | 85 | 94 | 6 |
| 7 | 300 | HQ[1] | 2 | 5.55 | 5.60 | 1.01 | 500 | 129 | 4 | 88 | 97 | 3 |
| 8 | 300 | HQ[1] | 2 | 5.55 | 5.60 | 1.01 | 460 | 125 | 3¾ | 90 | 98 | 2 |
| 9 | 200 | HQ[1] | 2 | 5.55 | 5.60 | 1.01 | 570 | 132 | 3½ | 80 | 99 | 1 |
| 10 | 200 | HQ[1] | 2 | 5.55 | 5.60 | 1.01 | 530 | 133 | 4½ | 89 | 99 | 1 |

[1] Hydroquinone.  [2] Freshly deaerated.

TABLE IB

[Reaction of butadiene and sulfur dioxide in emulsion system]

| Run | Water (grams) | Emulsifier | Antioxidants Type | Amount (gms.) | Butadiene (gm.-mols) | $SO_2$ (gm.-mols) | $SO_2$:butadiene (gm.-mols) (ratio) | Peak pressure (p.s.i.g.) | Peak temp. (°C.) | Time (hrs.) | Percent conv. | Percent 3-sulfolene | Percent polysulfone |
|---|---|---|---|---|---|---|---|---|---|---|---|---|---|
| 1 | 900 | Emcol P1059 | Ionol[1] | 6 | 3.36 | 6.22 | 1.86 | 200 | [4]44 | 16 | 100 | 32 | 68 |
| 2 | 450 | do | HQ[2] | 3 | 1.98 | 3.28 | 1.66 | 200 | [4]44 | 16 | | 80 | |
| 3 | 450 | do | Thiophenol plus $K_2S_2O_8$ | 7 | 2.11 | 3.51 | 1.66 | 100 | [4]31 | 16 | 39 | 18 | 82 |
| 4 | 450 | do | HQ | 3 | 1.85 | 3.83 | 2.06 | 300 | 100 | 1½ | 85 | 98 | 2 |
| 5 | 450 | do | HQ | 3 | 1.85 | 3.67 | 1.98 | 100 | [4]45 | 16 | 79 | 97 | 3 |
| 6 | 450 | do | Ionol | 3 | 1.94 | 4.15 | 2.14 | 360 | 100 | 1 | 84 | 74 | 26 |
| 7 | 450 | Witcamide No. 272 | HQ | 3 | 1.85 | 3.13 | 1.69 | 335 | 120 | 3½ | 85 | 99 | 1 |
| 8 | 450 | Emcol P1059 | TBC[3] | 3 | 1.87 | 1.87 | 1.01 | 360 | 112 | 3½ | | 65 | |

| Water (grams) | Emulsifier | Antioxidant Type | Amount (gms.) | Butadiene (gm-mols) | $SO_2$ (grm-mols) | $SO_2$:butadiene (gm-mols) (ratio) | Peak pressure (p.s.i.g.) | Peak temp. (°C.) | Reaction time (hrs.) | Percent conversion | Percent yield of 3-sulfolene | Percent yield of Polysulfone |
|---|---|---|---|---|---|---|---|---|---|---|---|---|
| 450 | Emcol P1059 | $n-C_8H_{17}SH$ | 3 | 2.11 | 3.01 | 1.43 | 300 | 97 | 1⅝ | 79 | 95 | 5 |
| 450 | do | $n-C_8H_{17}SH$ | 3 | 2.23 | 3.95 | 1.77 | 380 | 110 | 1 | 82 | 95 | 5 |
| 450 | do | $Na_2SO_3$ | 3 | 2.11 | 3.33 | 1.58 | 350 | 103 | 1½ | 100 | 42 | 58 |
| 450 | do | $Na_2S$–$9H_2O$ | 3 | 2.11 | 3.23 | 1.54 | 370 | 105 | 1 | 94 | 99 | 1 |
| 450 | do | $Na_2S_2O_4$ | 3 | 1.95 | 3.45 | 1.77 | 380 | 120 | 1¼ | 92 | 87 | 13 |
| 450 | do | $NaH_2PO_2H_2O$ | 3 | 1.95 | 3.58 | 1.83 | 380 | 123 | 2 | 88 | 97 | 3 |
| 450 | Witcamide No. 272 | $Na_2S_2O_4$ | 1 | 1.87 | 1.83 | 0.98 | 370 | 120 | 4 | 73 | 99 | 1 |
| 450 | do | $NaH_2PO_2$–$H_2O$ | 1 | 2.00 | 1.88 | 0.94 | 400 | 130 | 2½ | 81 | 96 | 4 |
| 450 | do | Hydroquinone | 1 | 1.85 | 1.89 | 1.02 | 390 | 117 | 3½ | 78 | 98 | 2 |
| 450 | Emcol P1059 | HQ | 3 | 2.05 | 2.40 | 1.17 | 310 | 120 | 2½ | 81 | 99 | 1 |
| 300 | do | HQ | 2 | 1.67 | 1.91 | 1.14 | 340 | 100 | 1 | 60 | 80 | 20 |
| 450 | do | HQ | 3 | 1.95 | 1.96 | 1.00 | 355 | 120 | 3½ | 75 | 99 | 1 |
| 300 | do | HQ | 3 | 1.85 | 1.72 | 0.93 | 320 | 100 | 2½ | 69 | 91 | 9 |
| 450 | Emcol F32-50 | HQ | 3 | 1.86 | 2.06 | 1.11 | 300 | 105 | 1 | 55 | 82 | 18 |
| 450 | do | HQ | 3 | 1.97 | 1.96 | 1.00 | 360 | 111 | 2½ | 62 | 92 | 8 |
| 450 | Emcol K8300 | HQ | 3 | 1.95 | 1.83 | 0.94 | 360 | 112 | 3 | 79 | 91 | 9 |
| 450 | Sipex A | HQ | 3 | 1.86 | 2.08 | 1.12 | 340 | 110 | 3½ | 67 | 90 | 10 |
| 450 | Sipex DEA | HQ | 3 | 1.93 | 2.03 | 1.05 | 380 | 122 | 2½ | 66 | 86 | 14 |
| 450 | Sipex LT6 | HQ | 3 | 1.85 | 1.87 | 1.01 | 390 | 120 | 2⅜ | 70 | 89 | 11 |
| 450 | Sipon MGS100 diethylamine. | HQ | 3 | 2.04 | 1.88 | 0.92 | 320 | 110 | 2 | 73 | 90 | 10 |

See footnotes at end of table.

TABLE—Continued

| Water (grams) | Emulsifier | Antioxidant Type | Antioxidant Amount (gms.) | Butadiene (gm-mols) | SO₂ (gm-mols) | SO₂:butadiene (gm-mols) (ratio) | Peak pressure (p.s.i.g.) | Peak temp. (°C.) | Reaction time (hrs.) | Percent conversion | Percent yield of— 3-sulfolene | Polysulfone |
|---|---|---|---|---|---|---|---|---|---|---|---|---|
| 450 | Laurylsulfate dimethylethanolamine. | HQ | 3 | 1.85 | 1.84 | 1.00 | 340 | 113 | 3 | 51 | 86 | 14 |
| 450 | Laurylsulfate | HQ | 3 | 1.76 | 1.86 | 1.05 | 390 | 122 | 2 | 70 | 90 | 10 |
| 450 | Triton X-100 | HQ | 3 | 1.91 | 1.85 | 0.97 | 400 | 110 | 3 | 66 | 86 | 14 |
| 450 | Witcamide No. 272 | HQ | 3 | 1.91 | 1.87 | 0.98 | 390 | 115 | 3½ | 80 | 98 | 2 |
| 450 | ...do... | HQ | 3 | 2.08 | 1.88 | 0.91 | 310 | 128 | 3½ | 92 | 99 | 1 |
| 450 | Sarkosyl O | HQ | 3 | 1.85 | 1.88 | 0.95 | 380 | 115 | 12¾ | 76 | 83 | 17 |
| 450 | Sarkosyl NL-30 | HQ | 3 | 2.04 | 1.94 | 0.92 | 360 | 111 | 2 | 68 | 97 | 3 |
| 900 | SF Flake⁵ | HQ | 6 | 3.76 | 3.76 | 1.00 | 520 | 130 | 3 | 69 | 99 | 1 |
| 900 | Duponol WAQE | HQ | 6 | 3.71 | 3.97 | 1.07 | 520 | 130 | 3⅚ | 88 | 93 | 7 |
| 900 | Miranol Jem. (conc.) | HQ | 6 | 3.81 | 3.77 | 0.99 | 500 | 122 | 3½ | 72 | 99 | 1 |
| 900 | Miranol C2MSF (Conc.) | HQ | 6 | 3.71 | 3.75 | 1.01 | 510 | 130 | 3⅚ | 84 | 99 | 1 |
| 900 | Strodex PK-90 | HQ | 6 | 3.71 | 3.75 | 1.01 | 510 | 125 | 3¼ | 80 | 95 | 5 |

¹ 2,6 di-tert-butyl 4-methyl phenol.
² Hydroquinone.
³ Tertiary butyl catechol.
⁴ Actual temperature rather than peak temperature.
⁵ Sodium salt of partially hydrogenated tallow fatty acid.

EXAMPLE III

This Example demonstrates the use of recycled mother liquor in the process of this invention.

The reactions shown in Table II were conducted in the same manner as in Example II. In Experiment 1, the reactants were prepared and charged into the reactor as in Example II. In Experiment 1A through 1F, the mother liquor resulting from Experiment 1 was used as the reaction medium without additional antioxidant being added. An additional 2 grams of hydroquinone were added to the mother liquor of Experiment 2 which, in turn, was used in Experiments 2A through 2E. For Experiments 2F through 2J, the mother liquor resulting from Experiment 2E was used without the use of additional antioxidant. In each of the predominant Experiments (Experiments 1 and 2), the reaction charge contained 450 grams of water and 2.1 grams of Emulsifier Emcol P1059.

TABLE II
[Reaction of butadiene and sulfur dioxide in emulsion system]

| Experiment | Hydroquinone (gms.) | Butadiene (gm.-mols) | SO₂ (gm.-mols) | SO₂:butadiene (ratio) | Peak pressure (p.s.i.g) | Peak temp. (°C.) | Reaction time (hrs.) | Percent conversion | Percent yield of— 3-sulfolene | Polysulfone |
|---|---|---|---|---|---|---|---|---|---|---|
| 1 | 3 | 3.71 | 3.75 | 1.01 | 320 | 127 | 3¾ | 71 | 99 | 1 |
| 1A | | 3.71 | 3.75 | 1.01 | 450 | 140 | 3¾ | 64 | 80 | 20 |
| 1B | | 3.71 | 3.75 | 1.01 | 380 | 120 | 4 | 94 | 84 | 16 |
| 1C | | 3.71 | 3.75 | 1.01 | 380 | 120 | 4 | 76 | 90 | 10 |
| 1D | | 3.71 | 3.75 | 1.01 | 400 | 132 | 4 | 86 | 78 | 22 |
| 1E | | 3.71 | 3.75 | 1.01 | 460 | 130 | 4½ | 81 | 76 | 24 |
| 1F | | 3.71 | 3.75 | 1.01 | 400 | 127 | 4 | 83 | 75 | 25 |
| 2 | 3 | 4.10 | 3.40 | 0.83 | 400 | 123 | 3 | 70 | 99 | 1 |
| 2A | ¹2 | 3.71 | 3.75 | 1.01 | 420 | 130 | 3¼ | 90 | 89 | 11 |
| 2B | ¹2 | 3.71 | 3.78 | 1.02 | 410 | 127 | 3 | 92 | 87 | 13 |
| 2C | ¹2 | 3.71 | 3.75 | 1.01 | 400 | 125 | 3¼ | 87 | 99 | 1 |
| 2D | ¹2 | 3.71 | 3.75 | 1.01 | 495 | 130 | 3 | 84 | 93 | 7 |
| 2E | ¹2 | 3.71 | 3.78 | 1.02 | 460 | 133 | 3¼ | 89 | 96 | 4 |
| 2F | | 3.71 | 4.10 | 1.10 | 500 | 132 | 3 | 91 | 93 | 7 |
| 2G | | 3.71 | 3.86 | 1.04 | 460 | 130 | 310/60 | 90 | 99 | 1 |
| 2H | | 3.71 | 3.82 | 1.03 | 480 | 130 | 300/60 | 92 | 92 | 8 |
| 2I | | 3.71 | 4.05 | 1.09 | 420 | 120 | 350/60 | 86 | 99 | 1 |
| 2J | | 3.71 | 3.75 | 1.01 | 480 | 130 | 430/60 | 91 | 99 | 1 |

¹ Grams of hydroquinone in addition to amount present in mother liquor.

It is known that diolefinic conjugated hydrocarbons, like butadiene, are relatively insoluble in water. Likewise, as set forth in Kirk-Othmer *Encyclopedia Chemical Technology*, Vol. 13, pp. 417–420, The Interscience Encyclopedia, Inc., New York (1954) states:

"Sulfur dioxide dissolves in water to form the weak acid, sulfurous acid, $H_2SO_3$. At a partial pressure for sulfur dioxide gas of 1 atm., solutions containing 18.5% $SO_2$ by weight are formed at 0° C. and 5.1% strength at 40° C. Under practical conditions where solutions are formed most often at 1 atm. total pressure with air or other diluent gases present, concentrations of from only ⅓ to ½ of these values are obtained."

It is thus seen that both reactants in the instant aqueous dispersion process are relatively insoluble in the water medium, or at best, only partially soluble.

It is believed that the reaction between butadiene and $SO_2$ occurs in a dispersed phase of butadiene/sulfur dioxide/water. The sulfolene is known to dissolve in both the water and dispersed phase. Thus it must partition itself between these two. So, also must any antioxidant added to the water phase. The degree to which the antioxidants dissolve in the two phases is dependent on their independent solubilities in each phase. Thus, in Example II, Table IA, hydroquinone, sodium dithionite ($Na_2S_2O_4$) and sodium hypophosphite ($NaH_2PO_2 \cdot H_2O$) are all very soluble in hot water. The effect of water solubility of the antioxidant coupled with the effect of water deaeration (run 3, Table IA) show that in this system the antioxidant in the water phase governs the course of the reaction.

The effect of antioxidant solubility in the water phase using emulsifiers is clearly shown by comparing the data of Table IB of the specification. Thus, Ionol (2,6-ditertiary butyl-4-methylphenol) which is a water insoluble stabilizer for styrene and other polymerizable or oxidizable hydrocarbons is less effective than hydroquinone (runs 1 and 5, Table IB) at lower temperatures giving only 32% sulfolene at 44° C. compared with 97% sulfolene with hydroquinone at 45° C. This same effect is also apparent but to a lesser extent at higher temperatures (runs 4 and 6, Table IB) where the yields of sulfolene are 74% and 98% respectively for Ionol and hydroquinone. It is believed that at higher temperatures Ionol becomes more water soluble which accounts for the substantially increased yield of sulfolene at 100° C.

EXAMPLE IV

This Example demonstrates the catalytic hydrogenation of 3-sulfolene prepared according to the process of this invention.

The hydrogenation of 3-sulfolene was conducted in aqueous solution using powdered or pelleted nickel catalyst and was carried out at 60 p.s.i.g. at a temperature of 40 to 50° C. A 2000 ml. Parr Series 4500 stirred Reactor and a 450 ml. Parr Series 3910 shaker type hydrogenation apparatus were employed.

A Parr Series 4500 stirred Reactor was used for hydrogenations at 100 p.s.i.g. or higher.

The catalyst, 3-sulfolene, water and other ingredients shown in Table III were added to the reactor which was then closed and evacuated with a water pump. After purging the reactants three times with hydrogen, the reaction mixture was stirred or shaken under a hydrogen pressure of 60 p.s.i.g. or higher and at 40° C. to 50° C. for the period of time shown in Table III.

After absorption of the hydrogen ceased, the reactor was opened and the catalyst filtered off. Water was removed by distillation at atmospheric pressure or under a vacuum. The residue was treated with methyl alcohol to recover unreduced 3-sulfolene. The alcohol solution was flash distilled to remove the methyl alcohol and the residue was then distilled at 136° C.–138° C. at a pressure of 3 to 4 mm. in order to obtain the pure sulfolane.

Results of these procedures are presented in Table III.

the first three experiments, high yields of sulfolene product were obtained.

EXAMPLE VI

Comparable results were obtained with pentadiene-1,3 (piperylene) under the same reaction conditions as described in Example V with the exception that the product was liquid.

Summarizing, it is thus seen that this invention provides a novel and efficient process for the preparation of sulfolene and sulfolane products. Variations may be made in proportions, procedures and materials without departing from the scope of this invention as defined in the following claim.

We claim:
1. A method for the preparation of sulfolene compounds by direct condensation of conjugated dienes with sulfur dioxide which comprises the steps of:
   (1) selecting a quantity of water for the reaction, and purging said water with a member selected from the group consisting of nitrogen, inert gas and steam to render said quantity of water non-oxygenating;
   (2) dispersing in said water a conjugated diene monomer corresponding to the formula

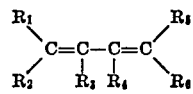

wherein $R_1$, $R_2$, $R_3$, $R_4$, $R_5$, and $R_6$ are independently selected from the group consisting of hydrogen atoms and alkyl, alkenyl, aryl, alkoxy, alkaryl, arakyl, cycloalkyl, cycoalkenyl and halogen radicals; in an amount from 5% to 170% of the weight of the water medium;
   (3) adding to said diene in water dispersion from 6%–190% of sulfur dioxide, as based on the weight of water, at a pressure of 60–550 pounds per square inch TABLE III
[Catalytic hydrogenation of 3-sulfolene in water]

| Water (grams) | 3-sulfolene (gm.-mols) | Catalyst Type | Catalyst Wt. percent | Additives Type | Additives Grams | Reaction temp. (° C.) | Initial $H_2$ pressure (p.s.i.g.) | $H_2$ absorbed (gm.-mols) | Time (hrs.) | Percent yield pure sulfolane |
|---|---|---|---|---|---|---|---|---|---|---|
| 500 | 0.5 | Powder | 4 | Emcol P1059 | 2 | Ambient | 630 | 0.64 | 1½ | 83 |
| 500 | 0.85 | do | 10 | | | 40–60 | 60 | 0.91 | 4 | 85 |
| 100 | 0.125 | do | 10 | | | 40–50 | 60 | 0.13 | 3 | 60 |
| 200 | 0.125 | Pellet | 30 | | | 40–50 | 60 | 0.13 | 6½ | 70 |
| 100 | 0.125 | do | 30 | MgO | 3 | 40–50 | 60 | 0.18 | 5 | 70 |
| 100 | 0.125 | do | 30 | ZnO | 3 | 40–50 | 60 | 0.15 | 5 | 83 |
| 100 | 0.125 | do | 30 | Witcamide | 0.5 | 40–50 | 60 | 0.15 | 6 | 87 |
| 100 | 0.125 | do | 20 | | | 40–50 | 61 | 0.15 | 3¾ | 80 |
| 100 | 0.125 | do | 10 | Witcamide | 0.5 | 40–50 | 61 | 0.157 | 16 | 80 |
| 100 | 0.125 | do | 10 | Emcol P1059 | 0.5 | 40–50 | 61 | 0.157 | 16 | 80 |
| 1,000 | 3.81 | Powder | 10 | | | 50–60 | 300 | 3.7 | 7¼ | 82.5 |
| 1,000 | 3.81 | do | 10 | ZnO | 10 | 50–60 | 300 | 3.7 | 8⅔ | 80.5 |

EXAMPLE V

This example demonstrates the use of 2-methyl-1,3-butadiene (isoprene) in the process of this invention.

The reactions shown in Table IV were conducted in the same manner as in Example II with the exception that 2-methyl-1,3-butadiene (isoprene) was substituted for the butadiene.

TABLE IV
[Reaction of 2-methyl-1,3-butadiene (isoprene) and sulfur dioxide in emulsion system]

| Water (gms.) | Emcol P1059 emulsifier (gms.) | Hydroquinone antioxidant (gms.) | Isoprene (moles) | $SO_2$ (moles) | $SO_2$: isoprene (mole ratio) | Peak pressure (p.s.i.g.) | Peak temp. (° C.) | Reaction time (hrs.) | Percent conversion | Percent yield of 3-methyl-3-sulfolene | Polysulfone |
|---|---|---|---|---|---|---|---|---|---|---|---|
| 450 | 2.1 | 3 | 1.47 | 1.56 | 1.06 | 220 | 128 | 3¾ | 75 | 99 | 1 |
| 450 | | 3 | 1.47 | 1.56 | 1.06 | 220 | 130 | 3¾ | 79 | 99 | 5 |
| 450[1] | | | 1.47 | 1.56 | 1.06 | 200 | 125 | | 67 | 84 | 161 |
| 450 | | | 1.47 | 1.56 | 1.06 | 165 | 129 | 3¼ | 85 | 18 | 85 |
| 450 | 2.1 | | 1.47 | 1.56 | 1.06 | 195 | 130 | 3½ | 82 | 15 | 82 |

[1] Freshly deaerated distilled water.

In addition to further illustrating the effectiveness of the process of this invention, the data presented in the above table indicates the necessity for utilizing non-oxygenating water such as deaerated water and/or water having an antioxidant therein in order to obtain high yields of sulfolene product in contrast to polysulfone. Thus a comparison between the first three experiments and the last two experiments in Table IV clearly indicates that where the oxygen effect on the system was inhibited, i.e., and a temperature of from 60° C.–150° C., for 1 to 5 hours to react said sulfur dioxide with said diene dispersion and to produce thereby a reaction mixture comprising a water slurry containing a solution of a sulfolene compound and a polymeric sulfone;
(4) dropping the pressure to ambient levels; and
(5) filtering said hot reaction mixture to remove said polymeric polysulfone from said solution containing the sulfolene compound.

References Cited

UNITED STATES PATENTS

| | | | |
|---|---|---|---|
| 1,196,259 | 8/1916 | Matthews et al. | 260—332.1 |
| 2,395,050 | 2/1946 | Hooker et al. | 260—327 |
| 2,443,270 | 6/1948 | Robey et al. | 260—329 |
| 2,578,565 | 12/1951 | Mahan et al. | 260—332.1 |

FOREIGN PATENTS

| | | | |
|---|---|---|---|
| 236,386 | 7/1911 | Germany | 260—332.1 |
| 506,839 | 9/1930 | Germany | 260—332.1 |

OTHER REFERENCES

McCutcheon, Detergents & Emulsifiers (Allured Pub. Co., Ridgewood, N.J., 1970), pp. 87, 94, 95, 149, 194, 202, 243, 255.

Chemical Rubber Handbook (Chem. Rubber Pub. Co., Cleveland, Ohio, 1962), pp. 876–879, 1030, 1031, 1038, 1039.

HENRY R. JILES, Primary Examiner

C. M. JAISLE, Assistant Examiner

UNITED STATES PATENT OFFICE
CERTIFICATE OF CORRECTION

Patent No. 3,822,286                    Dated July 2, 1974

Inventor(s) Herbert J. Goldstein - Hsiao-Jun Li

It is certified that error appears in the above-identified patent and that said Letters Patent are hereby corrected as shown below:

Column 3, line 3, "seelcted" should be -- selected --

Column 4, line 7, "buadiene" should be -- butadiene --

Column 5, line 27, after "effectively" insert -- be --

Table IB, Run 8, Butadiene (gm-mols) column, "1.87" should be -- 1.85 --

Table IV, Percent yield of Polysulfone column, the numerals reading down "1, 5, 161, 85, 82" should be -- 1, 1, 16, 82, 85 --

Column 12, line 16, "conjungated" should be -- conjugated --

Signed and sealed this 5th day of November 1974.

(SEAL)
Attest:

McCOY M. GIBSON JR.                    C. MARSHALL DANN
Attesting Officer                       Commissioner of Patents